United States Patent
Yoon et al.

(10) Patent No.: US 9,071,849 B2
(45) Date of Patent: Jun. 30, 2015

(54) METHOD AND APPARATUS FOR GENERATING VIDEO PACKETS, METHOD AND APPARATUS FOR RESTORING VIDEO

(75) Inventors: Jae-won Yoon, Seoul (KR); Sung-bum Park, Seongnam-si (KR); Hae-young Jun, Seoul (KR); Shin-wook Kang, Hwaseong-si (KR); Dai-woong Choi, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 287 days.

(21) Appl. No.: 13/082,929

(22) Filed: Apr. 8, 2011

(65) Prior Publication Data

US 2011/0249730 A1    Oct. 13, 2011

Related U.S. Application Data

(60) Provisional application No. 61/282,848, filed on Apr. 9, 2010.

(30) Foreign Application Priority Data

Oct. 29, 2010 (KR) .......................... 10-2010-0107018

(51) Int. Cl.
*H04N 19/00* (2014.01)
*H04N 19/593* (2014.01)

(52) U.S. Cl.
CPC ................................ *H04N 19/593* (2014.11)

(58) Field of Classification Search
CPC ....................................................... G06K 9/36
USPC ........................................ 375/240.13, 240.08
See application file for complete search history.

(56) References Cited

U.S. PATENT DOCUMENTS 5,309,232 A * 5/1994 Hartung et al. ............. 348/384.1
5,995,241 A * 11/1999 Nakatani et al. ............ 382/250
(Continued)

FOREIGN PATENT DOCUMENTS

KR    1020080046227 A    5/2008
KR    1020080095833 A    10/2008

OTHER PUBLICATIONS

O'Neal, "Differential Pulse-Code Modulation (PCM) with Entropy Coding", IEEE Transactions on Information Theory, vol. IT-22, No. 2, Mar. 1976. pp. 169-173.*

(Continued)

*Primary Examiner* — Jay Patel
*Assistant Examiner* — Frank Huang
(74) *Attorney, Agent, or Firm* — Sughrue Mion, PLLC (57) ABSTRACT

A method and apparatus for generating video packets and a method and apparatus for restoring video are provided. The method of generating video packets includes: generating at least one pixel block consisting of at least one reference pixel and a plurality of neighboring pixels adjacent to the at least one reference pixel from pixels of a video frame; replacing pixel values of the neighboring pixels in the at least one pixel block with pixel difference values, which are difference values between a pixel value of one of pixels adjacent to the neighboring pixels and the pixel values of the neighboring pixels; generating packets so that a pixel value of the at least one reference pixel and the pixel difference values of the neighboring pixels are allocated to different packets according to positions of the pixels; and performing entropy coding of some of the packets including the pixel difference values of the neighboring pixels.

14 Claims, 7 Drawing Sheets

(56) References Cited

U.S. PATENT DOCUMENTS

| | | | |
|---|---|---|---|
| 8,165,195 B2* | 4/2012 | Song | 375/240 |
| 8,345,753 B2* | 1/2013 | Lee et al. | 375/240.1 |
| 2007/0202842 A1 | 8/2007 | Shao et al. | |
| 2007/0202843 A1 | 8/2007 | Niu et al. | |

OTHER PUBLICATIONS

International Search Report (PCT/ISA/210) and Written Opinion (PCT/ISA/237) issued on Nov. 25, 2011 in the International Patent Application No. PCT/KR2011/002495.

* cited by examiner

METHOD AND APPARATUS FOR GENERATING VIDEO PACKETS, METHOD AND APPARATUS FOR RESTORING VIDEO

CROSS-REFERENCE TO RELATED PATENT APPLICATION

This application claims the benefit of U.S. Provisional Application No. 61/282,848, filed on Apr. 9, 2010 in the U.S. Patent and Trademark Office, and priority from Korean Patent Application No. 10-2010-0107018, filed on Oct. 29, 2010 in the Korean Intellectual Property Office, the disclosures of which are incorporated herein in their entirety by reference.

BACKGROUND

1. Field

Methods and apparatuses consistent with exemplary embodiments generally relate to generating video packets and restoring video.

2. Description of the Related Art

The development of computer, wired and wireless communication technologies has increased high quality digital video content. In this regard, applications and programs for reproducing high quality digital video content are additionally proposed for wired and wireless communication systems, and accordingly, demands of a high quality digital video content service are gradually and rapidly increasing.

However, since a bandwidth of a network for transmitting video content is limited, a method of efficiently transmitting high-volume video content is required.

SUMMARY

Exemplary embodiments provide a method and apparatus for generating video packets and a method and apparatus for restoring video.

According to an aspect of an exemplary embodiment, there is provided a method of generating video packets, the method including: generating at least one pixel block consisting of at least one reference pixel and a plurality of neighboring pixels adjacent to the at least one reference pixel from pixels of a video frame; replacing pixel values of the neighboring pixels in the at least one pixel block with pixel difference values, which are difference values between a pixel value of one of pixels adjacent to the neighboring pixels and the pixel values of the neighboring pixels; generating packets so that a pixel value of the at least one reference pixel and the pixel difference values of the neighboring pixels are allocated to different packets according to positions of the pixels; and performing entropy coding of some of packets including the pixel difference values of the neighboring pixels.

The performing of the entropy coding may further include performing Pulse Code Modulation (PCM) coding of packets to which the entropy coding is not applied from among a packet including the reference pixel and the packets including the pixel difference values of the neighboring pixels.

The method may further include determining a size of the at least one pixel block, wherein the at least one pixel block is generated based on the determined pixel block size.

The method may further include generating a plurality of slices by dividing the video frame in a slice unit having a predetermined size, wherein the generating of the at least one pixel block is performed for pixels in the plurality of slices.

The performing of the entropy coding may include: calculating the predicted number of bits of a coding result value to be obtained when the entropy coding is performed for each of the pixel difference values of the neighboring pixels included in each of the packets for the neighboring pixels; determining for each of the packets for the neighboring pixels whether a predicted bit number sum obtained by summing the predicted number of bits of a pixel difference value of each of the neighboring pixels is less than a current bit number sum obtained by summing the current number of bits of the pixel difference value of each of the neighboring pixels; and performing the entropy coding of only packets in which the predicted bit number sum is less than the current bit number sum from among the packets for the neighboring pixels.

According to an aspect of another exemplary embodiment, there is provided a method of restoring video, the method including: receiving a plurality of packets associated with pixels of a video frame; classifying the plurality of packets based on whether each of the plurality of packets is a first packet including pixel values of reference pixels, a second packet including pixel difference values, which are difference values between pixel values of the pixels, or a third packet in which entropy coding has been performed for pixel difference values; performing entropy decoding of the third packet based on a result of the classification; and restoring the video frame based on the pixel values of the reference pixels of the first packet, the pixel difference values of the second packet, and the pixel difference values of the decoded third packet.

The restoring of the video frame may include: restoring pixel values of first neighboring pixels adjacent to the reference pixels by adding first pixel difference values, which are difference values between the pixel values of the reference pixels and the pixel values of the first neighboring pixels, to the pixel values of the reference pixels; restoring pixel values of second neighboring pixels adjacent to the first neighboring pixels by adding second pixel difference values, which are difference values between the pixel values of the first neighboring pixels and pixel values of the second neighboring pixels, to the pixel values of the second neighboring pixels; and restoring the video frame based on the pixel values of the reference pixels, the pixel values of the first neighboring pixels, and the pixel values of the second neighboring pixels.

According to an aspect of another exemplary embodiment, there is provided an apparatus for generating video packets, the apparatus including: a pixel block generator for generating at least one pixel block consisting of at least one reference pixel and a plurality of neighboring pixels adjacent to the at least one reference pixel from pixels of a video frame; a pixel value management unit for replacing pixel values of the neighboring pixels in the at least one pixel block with pixel difference values, which are difference values between a pixel value of one of pixels adjacent to the neighboring pixels and the pixel values of the neighboring pixels; a packet generator for generating packets so that a pixel value of the at least one reference pixel and the pixel difference values of the neighboring pixels are allocated to different packets according to positions of the pixels; and a coder for performing entropy coding of some of packets including the pixel difference values of the neighboring pixels.

According to an aspect of another exemplary embodiment, there is provided an apparatus for restoring video, the apparatus including: a receiver for receiving a plurality of packets associated with pixels of a video frame; a packet classifier for classifying the plurality of packets based on whether each of the plurality of packets is a first packet including pixel values of reference pixels, a second packet including pixel difference values, which are difference values between pixel values of the pixels, or a third packet in which entropy coding has been performed for pixel difference values; a decoder for performing entropy decoding of the third packet based on a result of the classification; and a restorer for restoring the video frame based on the pixel values of the reference pixels of the first packet, the pixel difference values of the second packet, and the pixel difference values of the decoded third packet.

According to an aspect of another exemplary embodiment, there is provided a computer-readable recording medium storing a computer-readable program for executing a method of generating video packets, the method including: generating at least one pixel block consisting of at least one reference pixel and a plurality of neighboring pixels adjacent to the at least one reference pixel from pixels of a video frame; replacing pixel values of the neighboring pixels in the at least one pixel block with pixel difference values, which are difference values between a pixel value of one of pixels adjacent to the neighboring pixels and the pixel values of the neighboring pixels; generating packets so that a pixel value of the at least one reference pixel and the pixel difference values of the neighboring pixels are allocated to different packets according to positions of the pixels; and performing entropy coding of some of packets including the pixel difference values of the neighboring pixels.

According to an aspect of another exemplary embodiment, there is provided a computer-readable recording medium storing a computer-readable program for executing a method of restoring video, the method including: receiving a plurality of packets associated with pixels of a video frame; classifying the plurality of packets based on whether each of the plurality of packets is a first packet including pixel values of reference pixels, a second packet including pixel difference values, which are difference values between pixel values of the pixels, or a third packet in which entropy coding has been performed for pixel difference values; performing entropy decoding of the third packet based on a result of the classification; and restoring the video frame based on the pixel values of the reference pixels of the first packet, the pixel difference values of the second packet, and the pixel difference values of the decoded third packet.

BRIEF DESCRIPTION OF THE DRAWINGS

The above and other aspects will become more apparent by describing in detail exemplary embodiments with reference to the attached drawings in which.

DETAILED DESCRIPTION OF EXEMPLARY EMBODIMENTS

The present invention will now be described more fully with reference to the accompanying drawings, in which exemplary embodiments of the invention are shown.

Figure 1:
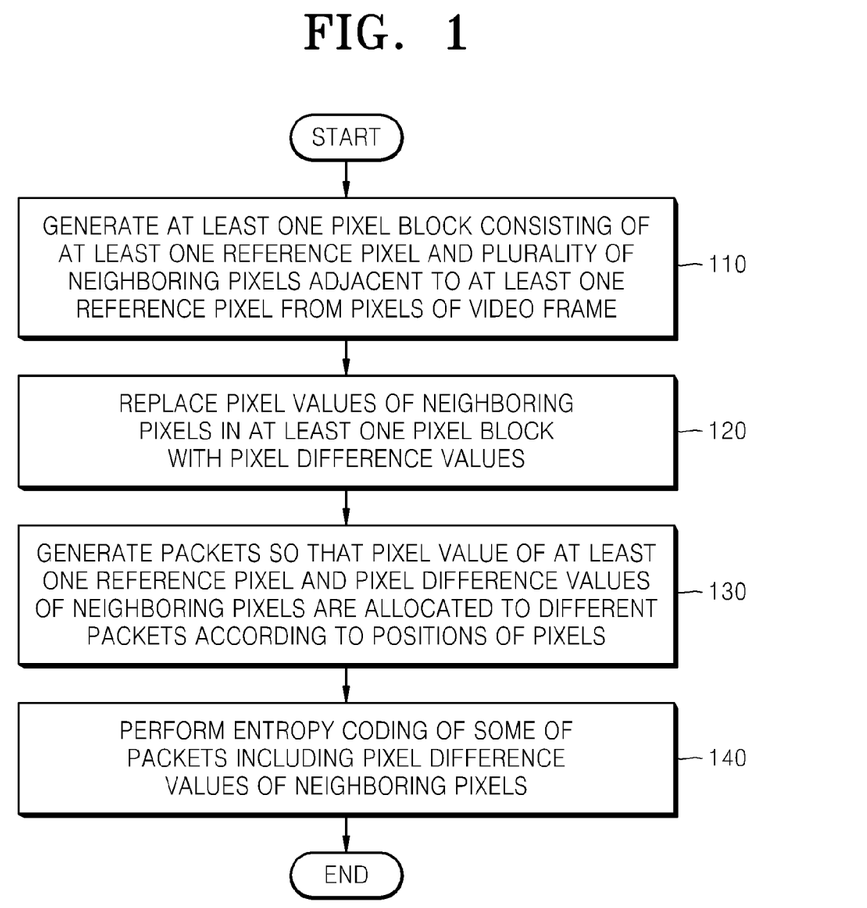
FIG. 1 is a flowchart of a method of generating video packets according to an exemplary embodiment.

FIG. 1 is a flowchart of a method of generating video packets according to an exemplary embodiment.

In operation 110, at least one pixel block consisting of at least one reference pixel and a plurality of neighboring pixels adjacent to the at least one reference pixel is generated from pixels of a video frame.

A reference pixel is only one pixel existing per pixel block and is a pixel first referred to when a difference value between pixel values of two pixels in each pixel block.

According to another exemplary embodiment, the method of generating video packets may further include determining a size of a pixel block before performing operation 110, and in operation 110, the at least one pixel block may be generated based on the determined pixel block size.

For example, the pixel block size may be determined as 1 pixel×2 pixels, 2 pixels×2 pixels, 2 pixels×4 pixels, 4 pixels×4 pixels, 4 pixels×8 pixels, or 8 pixels×8 pixels.

A method of generating the at least one pixel block according to an exemplary embodiment will be described later with reference to FIG. 5.

In operation 120, pixel values of the neighboring pixels in the at least one pixel block are replaced with pixel difference values, which are difference values between a pixel value of one of pixels adjacent to the neighboring pixels and the pixel values of the neighboring pixels.

For example, if it is assumed that a pixel value of a reference pixel is 50 and a pixel value of a neighboring pixel adjacently located at the right of the reference pixel is 52, a difference value between the pixel value of the reference pixel and the pixel value of the neighboring pixel adjacently located at the right of the reference pixel is +2, and finally, the pixel value of the neighboring pixel adjacently located at the right of the reference pixel is replaced with +2.

In operation 130, packets are generated so that a pixel value of the at least one reference pixel and the pixel difference values of the neighboring pixels are allocated to different packets according to positions of the pixels For example, a pixel value of a reference pixel may be included in a first packet, a pixel difference value of a neighboring pixel adjacently located at the right of the reference pixel may be included in a second packet, and a pixel difference value of a neighboring pixel adjacently located below the reference pixel may be included in a third packet. If a receiver receives these three packets, after original pixel values of the neighboring pixels are restored based on the pixel value of the reference pixel included in the first packet and the pixel difference values of the neighboring pixels included in the second and third packets, a video frame may be restored based on the restored pixel values of the neighboring pixels and the pixel value of the reference pixel.

According to an exemplary embodiment, by allocating pixels included in a video frame to different packets according to positions of the pixels in at least one pixel block and generating the packets, even video content having a large volume can be transmitted in a format of packets having a small volume. Through this, a streaming service of high image quality video content having a large volume can be provided even through a network having a narrow bandwidth.

In operation 140, entropy coding is performed for some of the packets including the pixel difference values of the neighboring pixels.

Here, there may be various criteria for determining packets to which the entropy coding is applied.

For example, packets to which the entropy coding is applied may be determined based on positions of pixels in the at least one pixel block.

If the entropy coding is performed for packets, a volume of the packets generated in operation 130 may be reduced. If a receiver receives packets to which the entropy coding is applied, the receiver may restore pixel difference values of neighboring pixels by performing entropy decoding of the packets. Here, the entropy coding may be performed based on a Huffman look-up table or an exponential golomb look-up table.

Figure 2:
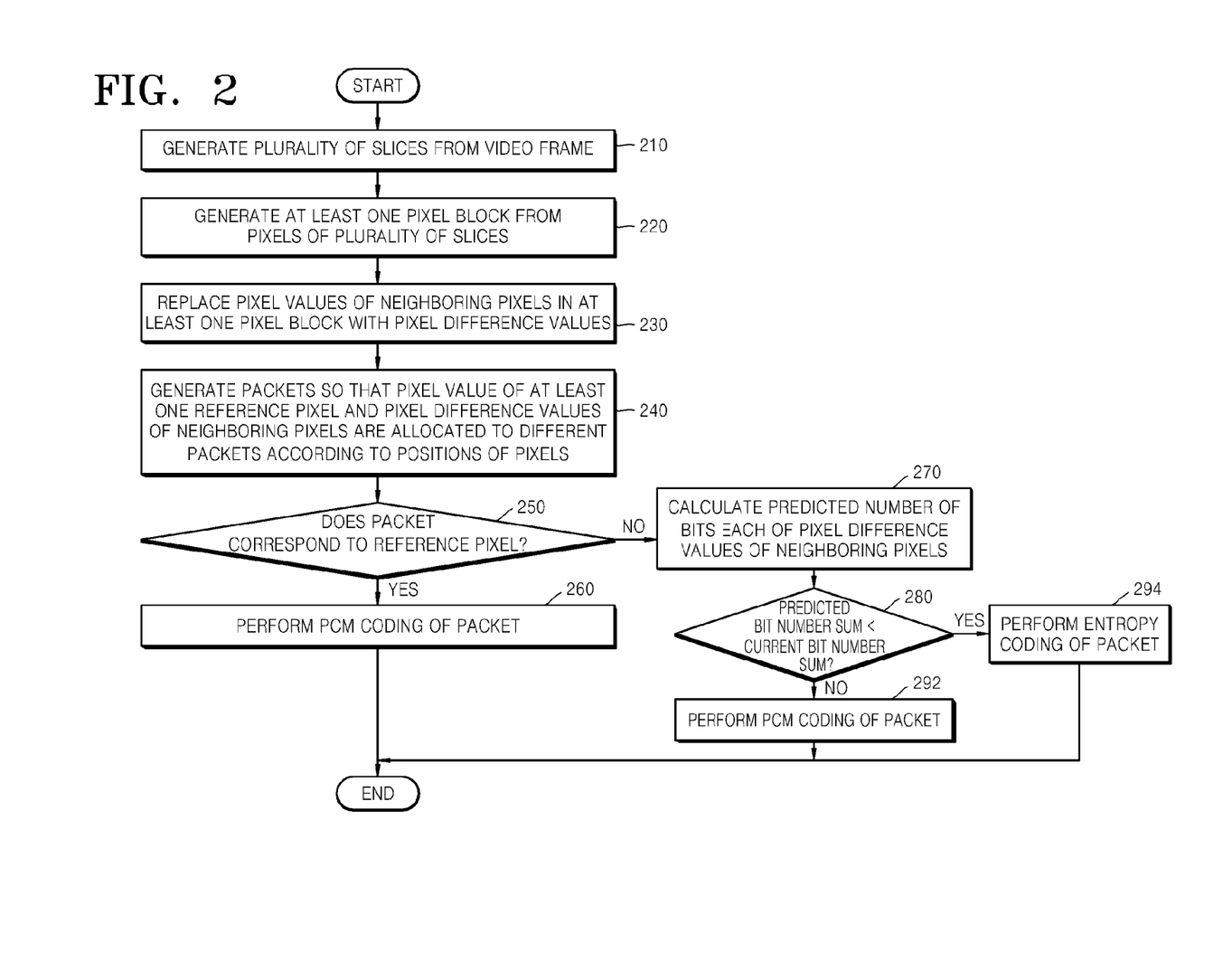
FIG. 2 is a flowchart of a method of generating video packets according to another exemplary embodiment.

FIG. 2 is a flowchart of a method of generating video packets according to another exemplary embodiment.

In operation 210, a plurality of slices are generated by dividing a video frame in a slice unit having a predetermined size.

An exemplary embodiment associated with operation 210 is described with reference to FIG. 3.

Figure 3:
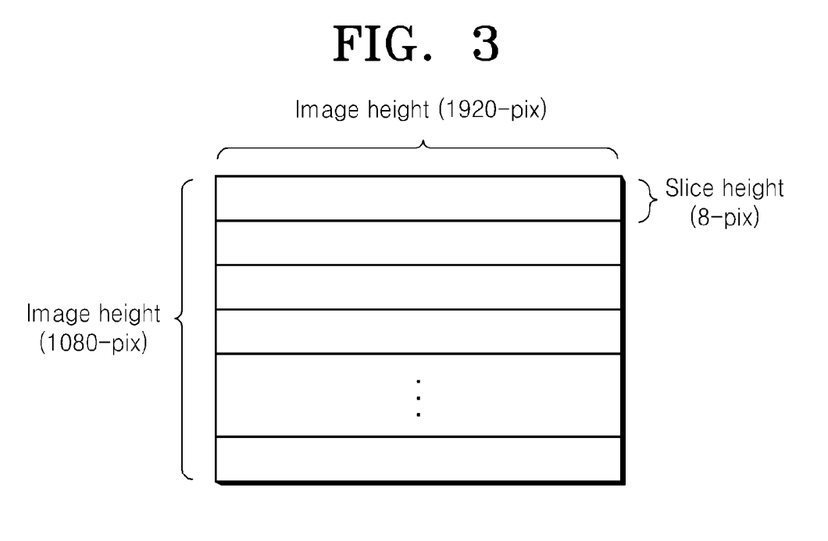
FIG. 3 is a diagram for describing a method of generating a plurality of slices from a video frame, according to an exemplary embodiment.

FIG. 3 is a diagram for describing a method of generating a plurality of slices from a video frame, according to an exemplary embodiment.

Referring to FIG. 3, a video frame having 1920 pixels× 1080 pixels is divided in a slice unit having an 8-pixel size. Although the video frame is divided in a slice unit having an 8-pixel size in the current embodiment, the present invention is not limited thereto.

In operation 220, at least one pixel block consisting of at least one reference pixel and a plurality of neighboring pixels adjacent to the at least one reference pixel is generated from pixels of the plurality of slices.

In operation 230, pixel values of the neighboring pixels in the at least one pixel block are replaced with pixel difference values, which are difference values between a pixel value of one of pixels adjacent to the neighboring pixels and the pixel values of the neighboring pixels.

In operation 240, packets are generated so that a pixel value of the at least one reference pixel and the pixel difference values of the neighboring pixels are allocated to different packets according to positions of the pixels.

In operation 250, it is determined whether a packet corresponds to the at least one reference pixel. If it is determined that the packet corresponds to the at least one reference pixel, the process proceeds to operation 260. Otherwise, the process proceeds to operation 270.

In operation 260, Pulse Code Modulation (PCM) coding of the packet is performed.

According to another exemplary embodiment, packet type information indicating that the packet corresponds to the at least one reference pixel and that the PCM coding of the packet has been performed may be included in the packet.

In operation 270, if the packet corresponds to the neighboring pixels, the predicted number of bits of a coding result value to be obtained when the entropy coding is performed for each of pixel difference values of neighboring pixels included in each of packets for the neighboring pixels is calculated.

A method of calculating the predicted number of bits of neighboring pixels will now be described with reference to FIG. 4.

Figure 4:
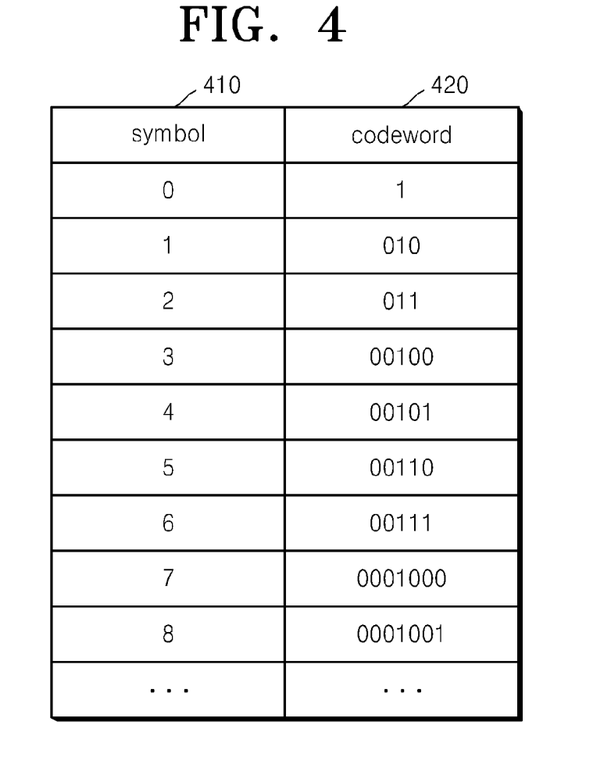
FIG. 4 is a diagram for describing a method of calculating the predicted number of bits of neighboring pixels, according to an exemplary embodiment.

FIG. 4 is a diagram for describing a method of calculating the predicted number of bits of neighboring pixels, according to an exemplary embodiment.

FIG. 4 shows, an exponential golomb look-up table in which symbols 410 from 0 to 8 are shown on the left and codewords 420 corresponding to the symbols 410 are shown on the right.

The symbols 410 indicate original values before the entropy coding is performed, and the codewords 420 indicate coding result values to be obtained when the entropy coding is performed for the symbols 410.

For example, if the entropy coding is performed for a symbol 410 having a value of 0, a coding result value is 1, and if the entropy coding is performed for a symbol 410 having a value of 1, a coding result value is 010.

If a packet includes pixel difference values of 4 neighboring pixels, and if the pixel difference values are 0, 1, 2, and 3, codewords corresponding to the pixel difference values are 1, 010, 011, and 00100, respectively, and the predicted numbers of bits of coding result values of the pixel difference values of the 4 neighboring pixels in the packet are 1, 3, 3, and 5, respectively.

Although the symbols 410 from 0 to 8 are shown in FIG. 4, the number of symbols 410 is not limited.

In operation 280, it is determined for each of the packets for the neighboring pixels whether a predicted bit number sum obtained by summing the predicted number of bits of a pixel difference value of each of the neighboring pixels included in each packet is less than a current bit number sum obtained by summing the current number of bits of the pixel difference value of each of the neighboring pixels. If it is determined that the predicted bit number sum is less than the current bit number sum, the process proceeds to operation 294. Otherwise, the process proceeds to operation 292.

For example, if pixel difference values of neighboring pixels have a range between −255 and 255, a total of 9 bits including 1 bit for indicating a sign and 8 bits for indicating a number are needed to indicate a single pixel difference value. That is, the current number of bits of a pixel difference value of each of the neighboring pixels is 9. Binary values of +1 and −1 may be indicated as 000000001 and 100000001, respectively.

If it is assumed that a packet includes pixel difference values, e.g., 0, 1, 2, and 3, of 4 neighboring pixels, a current bit number sum obtained by summing the current number of bits of a pixel difference value of each of the neighboring pixels is 9+9+9+9=36. In this case, a predicted bit number sum obtained by summing the predicted number of bits of a pixel difference value of each of the neighboring pixels is 1+3+3+5=12.

As a result of the above calculations, the predicted bit number sum of the pixel difference values of the neighboring pixels is 12 less than 36 that is the current bit number sum of the pixel difference values of the neighboring pixels.

In operation 292, if the predicted bit number sum of pixel difference values of neighboring pixels included in a packet is equal to or greater than the current bit number sum, PCM coding of the packet is performed.

According to another exemplary embodiment, packet type information indicating that the packet corresponds to the neighboring pixels and that the PCM coding of the packet has been performed may be included in the packet.

In operation 294, if the predicted bit number sum of pixel difference values of neighboring pixels included in a packet is less than the current bit number sum, entropy coding of the packet is performed.

By performing the entropy coding of the packet, a volume of the packet may be reduced.

According to another exemplary embodiment, packet type information indicating that the packet corresponds to the neighboring pixels and that the entropy coding of the packet has been performed may be included in the packet.

Figure 5:
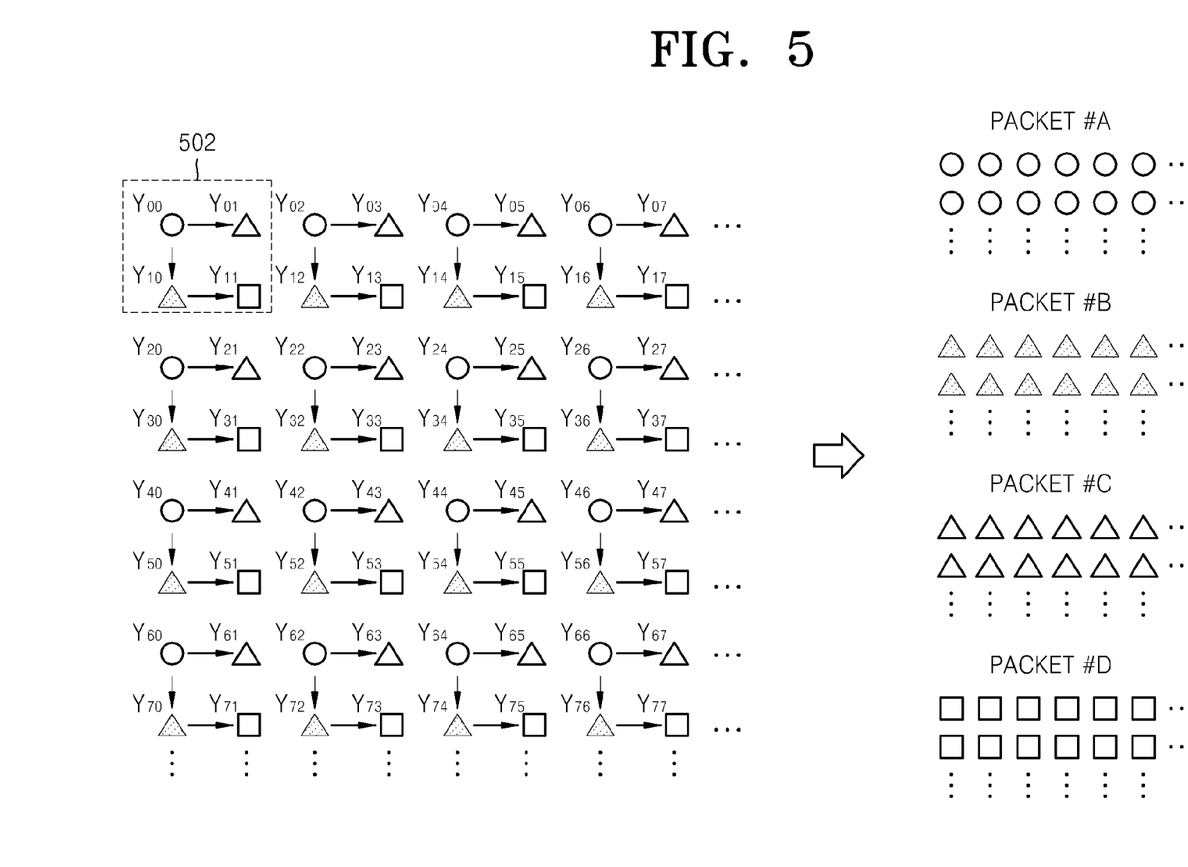
FIG. 5 is a diagram for describing pixel blocks, according to an exemplary embodiment.

FIG. 5 is a diagram for describing pixel blocks, according to an exemplary embodiment.

FIG. 5 shows 16 pixel blocks, each pixel block having a size of 2 pixels×2 pixels.

For a pixel block 502 located at the left uppermost, Y00 indicated by a circle denotes a reference pixel, Y01 and Y10 indicated by a triangle denote first neighboring pixels, and Y11 indicated by a rectangle denotes a second neighboring pixel. An arrow marked in a direction from Y00 to Y01 indicates that a pixel value of a first neighboring pixel Y01 is replaced with a difference value between a pixel value of the reference pixel Y00 and the pixel value of the first neighboring pixel Y01. Similarly, a pixel value of a first neighboring pixel Y10 is replaced with a difference value between the pixel value of the reference pixel Y00 and the pixel value of the first neighboring pixel Y10.

The rectangle indicating the second neighboring pixel Y11 indicates that a pixel difference value of the second neighboring pixel Y11 is generated with reference to the first neighboring pixel Y10 instead of the reference pixel Y00. Accordingly, a receiver must use a restored pixel value of the first neighboring pixel Y10 after first restoring the pixel value of the first neighboring pixel Y10 in order to restore a pixel value of the second neighboring pixel Y11.

A method of generating a pixel difference values of a first neighboring pixel and a second neighboring pixel in a pixel block having a size of 2 pixels×2 pixels will be described in detail later with reference to FIG. 6.

Packets to which the pixel value of the reference pixel Y00, pixel difference values of the first neighboring pixels Y01 and Y10, and the pixel difference value of the second neighboring pixel Y11 are allocated are shown on the right of FIG. 5. That is, in the pixel block 502 located at the left uppermost of FIG. 5, the pixel value of the reference pixel Y00 is included in a packet A, the pixel value of the first neighboring pixel Y01 is included in a packet B, the pixel value of the first neighboring pixel Y10 is included in a packet C, and a pixel value of the second neighboring pixel Y11 is included in a packet D. In the 15 remaining pixel blocks in FIG. 5, pixel values and pixel difference values of pixels are allocated to packets in the same way as that in the pixel block 502 located at the left uppermost of FIG. 5.

The packets may be generated in the order of the packet A, the packet B, the packet C, and the packet D according to importance of the packets. That is, since the most important packet is the packet A including reference pixels when a receiver receives the packets, the packet A may be first generated, and since neighboring pixels included in the packet D are restorable after neighboring pixels included in the packet C are restored, the packet D is least important and thus is last generated.

According to another exemplary embodiment, unequal error protection may be applied to packets according to importance of the packets.

That is, in the prior embodiment, the strongest error protection may be applied to the packet A, and the weakest error protection may be applied to the packet D. For example, the number of bits allocated to packets for error correction may be large in the order of the packet A, the packet B, the packet C, and the packet D.

Although a position of a reference pixel is located at the left uppermost of each pixel block in FIG. 5, the present invention is not limited thereto. For example, a position of a reference pixel may be located at the right uppermost of each pixel block.

Figure 6:
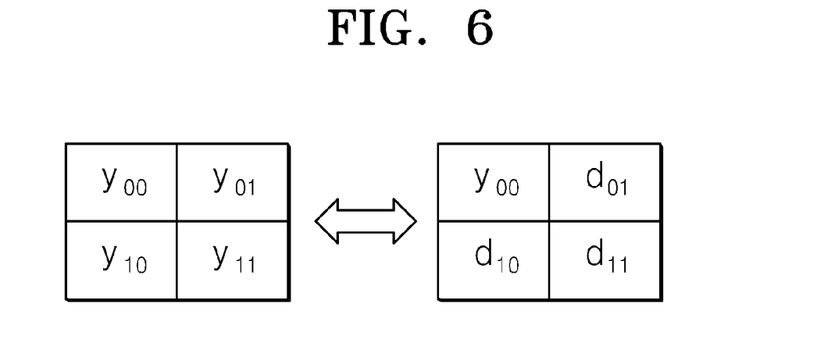
FIG. 6 is a diagram for describing a method of generating pixel difference values of neighboring pixels, according to an exemplary embodiment.

FIG. 6 is a diagram for describing a method of generating pixel difference values of neighboring pixels, according to an exemplary embodiment.

Referring to FIG. 6, a pixel value y00 of a reference pixel Y00, a pixel value y01 of a first neighboring pixel Y01, a pixel value y10 of a first neighboring pixel Y10, and a pixel value y11 of a second neighboring pixel Y11 are shown on the left of FIG. 6.

The pixel value y00 of the reference pixel Y00, a pixel difference value d01 of the first neighboring pixel Y01, a pixel difference value d10 of the first neighboring pixel Y10, and a pixel difference value d11 of the second neighboring pixel Y11 are shown on the right of FIG. 6.

The pixel difference value d01 of the first neighboring pixel Y01 is obtained by subtracting the pixel value y00 of the reference pixel Y00 from the pixel value y01 of the first neighboring pixel Y01, the pixel difference value d10 of the first neighboring pixel Y10 is obtained by subtracting the pixel value y00 of the reference pixel Y00 from the pixel value y10 of the first neighboring pixel Y10, and the pixel difference value d11 of the second neighboring pixel Y11 is obtained by subtracting the pixel value y10 of the first neighboring pixel Y10 from the pixel value y11 of the second neighboring pixel Y11.

The methods of generating video packets have been described. Hereinafter, methods of restoring video in a receiver receiving the generated video packets are described.

Figure 7:
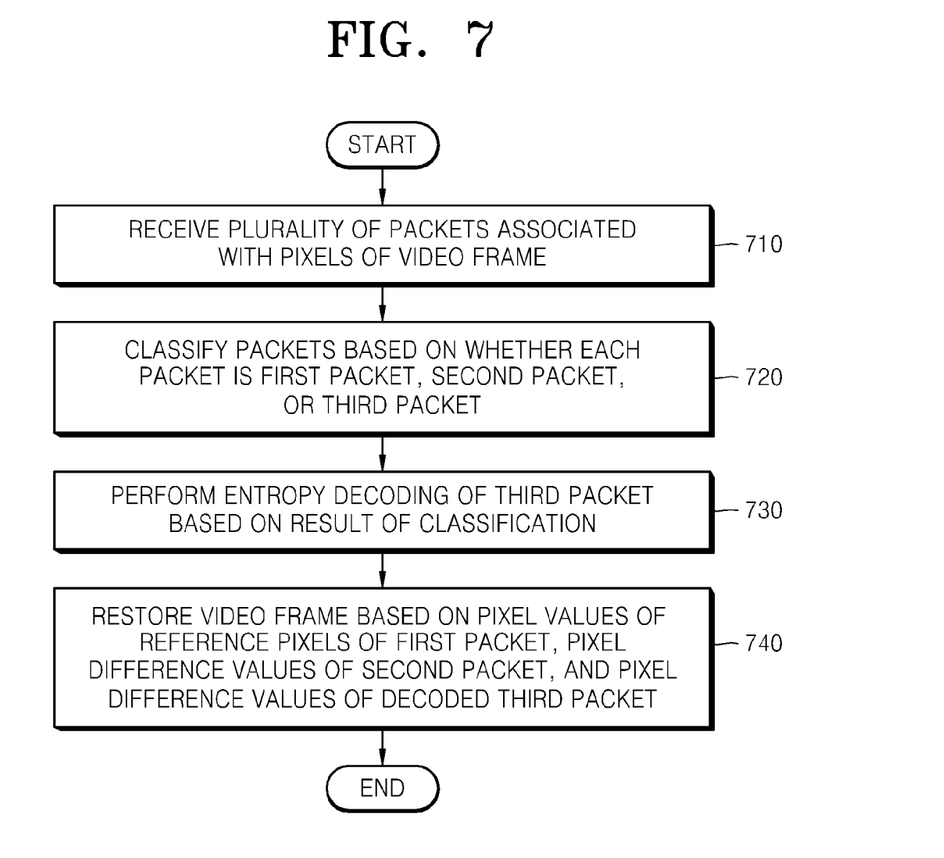
FIG. 7 is a flowchart of a method of restoring video according to an exemplary embodiment.

FIG. 7 is a flowchart of a method of restoring video according to an exemplary embodiment.

Referring to FIG. 7, in operation 710, a plurality of packets associated with pixels of a video frame are received.

In operation 720, the plurality of packets are classified based on whether each of the plurality of packets is a first packet including pixel values of reference pixels, a second packet including pixel difference values, which are difference values between pixel values of the pixels, or a third packet in which entropy coding has been performed for pixel difference values.

In operation 730, entropy decoding of the third packet is performed based on a result of the classification.

In operation 740, the video frame is restored based on the pixel values of the reference pixels of the first packet, the pixel difference values of the second packet, and the pixel difference values of the decoded third packet.

The restoring method will now be described with reference to FIG. 6.

The pixel value y01 of the first neighboring pixel Y01 is restored by summing the pixel value y00 of the reference pixel Y00 and the pixel difference value d01 of the first neighboring pixel Y01.

The pixel value y10 of the first neighboring pixel Y10 is restored by summing the pixel value y00 of the reference pixel Y00 and the pixel difference value d10 of the first neighboring pixel Y10.

The pixel value y11 of the second neighboring pixel Y11 s restored by summing the pixel value y10 of the first neighboring pixel Y10 and the pixel difference value d11 of the second neighboring pixel Y11.

When pixel values of neighboring pixels in the other pixel blocks are restored through the same restoring process as described above, the video frame is restored based on the restored pixel values of the neighboring pixels and the pixel values of the reference pixels.

Figure 8:
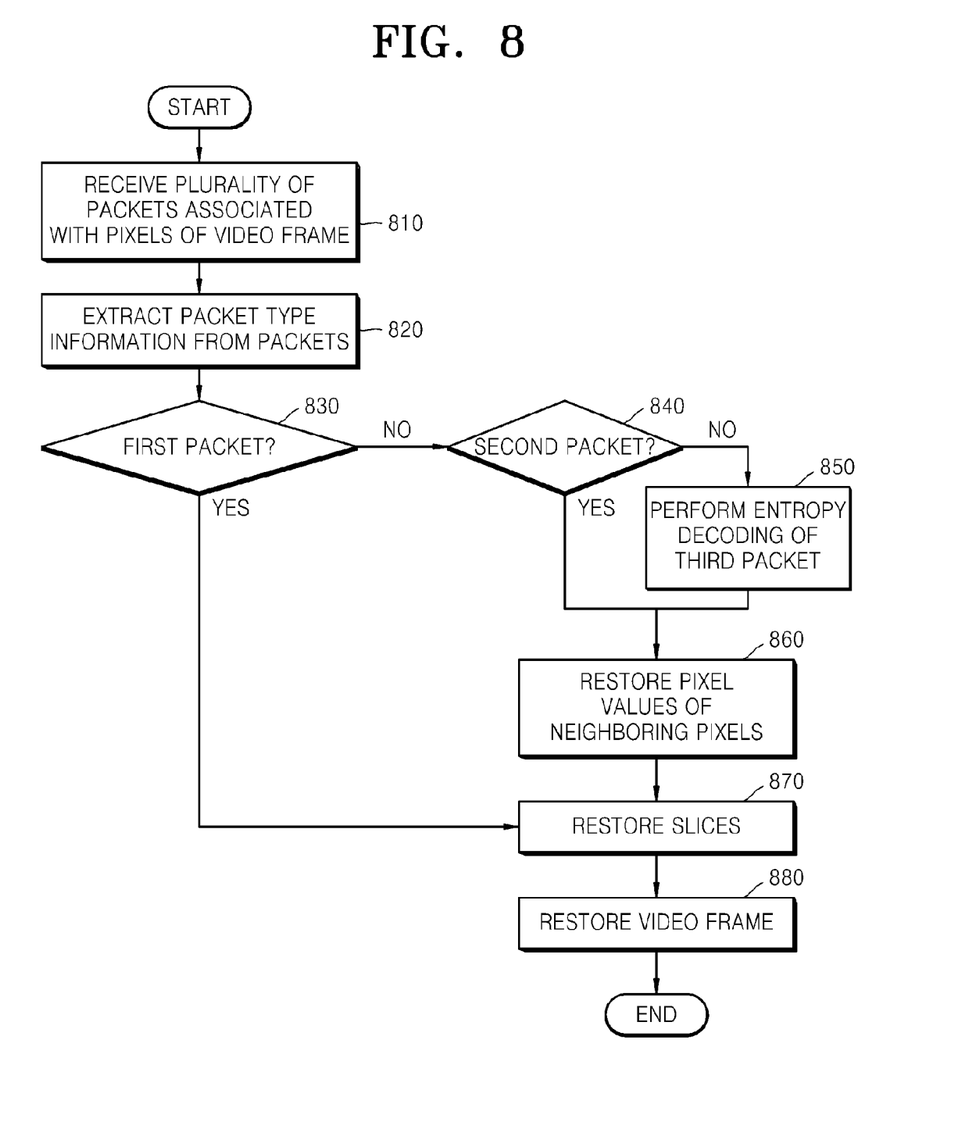
FIG. 8 is a flowchart of a method of restoring video according to another exemplary embodiment.

FIG. 8 is a flowchart of a method of restoring video according to another exemplary embodiment.

Referring to FIG. 8, in operation 810, a plurality of packets associated with pixels of a video frame are received.

In operation 820, packet type information is extracted from the plurality of packets.

The packet type information may include information regarding whether each of the plurality of packets is a first packet including pixel values of reference pixels, a second packet including pixel difference values, which are difference values between pixel values of the pixels, or a third packet in which entropy coding has been performed for pixel difference values.

In operation 830, it is determined based on the packet type information whether a received packet is the first packet including pixel values of reference pixels. If it is determined the received packet is the first packet including pixel values of reference pixels, the process proceeds to operation 870. Otherwise, the process proceeds to operation 840.

In operation 840, it is determined based on the packet type information whether the received packet is the second packet in which the entropy coding is not performed for pixel difference values, which are difference values between pixel values of the pixels. If it is determined that the received packet is the second packet, the process proceeds to operation 860. Otherwise, the process proceeds to operation 850.

In operation 850, it is determined that the received packet is the third packet in which the entropy coding has been performed for pixel difference values, and entropy decoding of the third packet is performed.

In operation 860, pixel values of neighboring pixels included in packets determined as the second packet and pixel values of neighboring pixels included in packets determined as the entropy-decoded third packet are restored with reference to the reference pixels included in a packet determined as the first packet.

In operation 870, if all of the neighboring pixels included in the packets corresponding to the second packet and the packets corresponding to the third packet are restored, video slices are restored by using the restored neighboring pixels and the reference pixels included in the packet corresponding to the first packet.

In operation 880, the video frame is restored based on the restored video slices.

Figure 9:
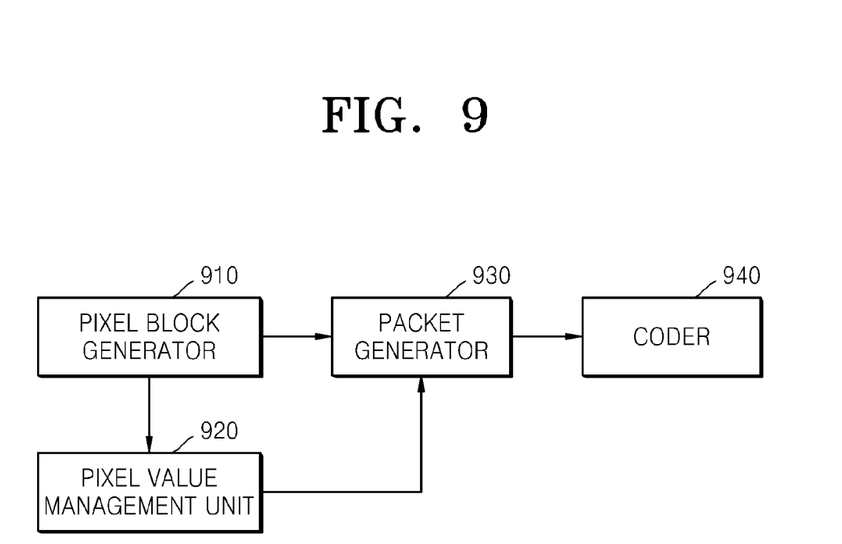
FIG. 9 is a block diagram of an apparatus for generating video packets according to an exemplary embodiment.

FIG. 9 is a block diagram of an apparatus for generating video packets according to an exemplary embodiment.

Referring to FIG. 9, the apparatus includes a pixel block generator 910, a pixel value management unit 920, a packet generator 930, and a coder 940.

The pixel block generator 910 generates at least one pixel block consisting of at least one reference pixel and a plurality of neighboring pixels adjacent to the at least one reference pixel from pixels of a video frame The pixel value management unit 920 replaces pixel values of the neighboring pixels in the at least one pixel block with pixel difference values, which are difference values between a pixel value of one of pixels adjacent to the neighboring pixels and the pixel values of the neighboring pixels The packet generator 930 generates a plurality of packets by allocating a pixel value of the at least one reference pixel, which is transmitted from the pixel block generator 910, and the pixel difference values of the neighboring pixels, which are transmitted from the pixel value management unit 920, to different packets according to positions of the pixels The coder 940 performs entropy coding of some of packets transmitted from the packet generator 930 according to a predetermined criterion.

Although the entropy coding is used to reduce a volume of packets in the present invention, various kinds of coding schemes for reducing a volume of packets may be applied to the packets instead of the entropy coding.

Figure 10:
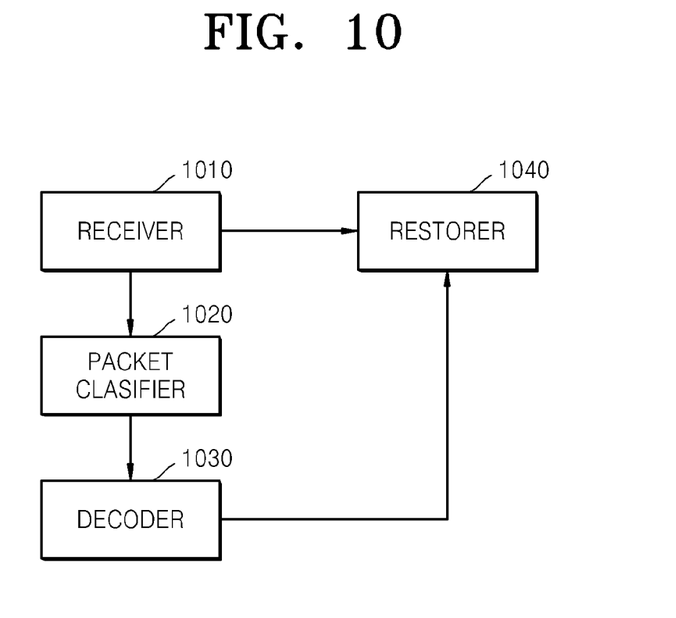
FIG. 10 is a block diagram of an apparatus for restoring video according to an exemplary embodiment.

FIG. 10 is a block diagram of an apparatus for restoring video according to an exemplary embodiment.

Referring to FIG. 10, the apparatus includes a receiver 1010, a packet classifier 1020, a decoder 1030, and a restorer 1040.

The receiver 1010 receives a plurality of packets associated with pixels of a video frame The packet classifier 1020 classifies the plurality of packets based on whether a received packet is a first packet including pixel values of reference pixels, a second packet including pixel difference values, which are difference values between pixel values of the pixels, or a third packet in which entropy coding has been performed for pixel difference values.

The decoder 1030 performs entropy decoding of the third packet based on a result of the classification The restorer 1040 restores the video frame based on the pixel values of the reference pixels of the first packet, the pixel difference values of the second packet, and the pixel difference values of the decoded third packet.

The exemplary embodiments can be implemented as computer programs stored in a computer readable recording medium and executed in general-use digital computers. Examples of the computer readable recording medium include magnetic storage media (e.g., ROM, floppy disks, hard disks, etc.) and optical recording media (e.g., CD-ROMs, or DVDs).

While exemplary embodiments have been particularly shown and described, it will be understood by those of ordinary skill in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the inventive concept.

What is claimed is:

1. A method of generating video packets, the method comprising:
    generating from pixels of a video frame at least one pixel block comprising at least one reference pixel and a plurality of neighboring pixels adjacent to the at least one reference pixel;
    replacing pixel values of the neighboring pixels in the at least one pixel block with pixel difference values, which are difference values between a pixel value of one of pixels adjacent to the neighboring pixels and the pixel values of the neighboring pixels;
    generating packets so that a pixel value of the at least one reference pixel and the pixel difference values of the neighboring pixels are allocated to different packets according to positions of the pixels;
    determining whether a packet includes the reference pixel;
    performing pulse code modulation coding, without performing entropy coding, of packets including the reference pixel based on a result of the determining; and
    selectively performing entropy coding of packets that do not include the reference pixel based on the result of the determining,
    wherein the performing of the entropy coding comprises performing entropy coding of a first subset of packets including the pixel difference values and performing pulse code modulation coding, without performing entropy coding, of a second subset of packets including the pixel difference values, the second subset of packets being different from the first subset of packets, wherein the packets to which the entropy coding is applied are determined based on positions of pixels in the at least one pixel block.

2. The method of claim 1, further comprising determining a size of the at least one pixel block, wherein the at least one pixel block is generated based on the determined pixel block size.

3. The method of claim 1, further comprising generating a plurality of slices by dividing the video frame in a slice unit having a predetermined size,
   wherein the generating the at least one pixel block is performed for pixels in the plurality of slices.

4. The method of claim 1, wherein the performing the entropy coding comprises:
   calculating a predicted number of bits of a coding result value to be obtained when the entropy coding is performed for each of the pixel difference values of the neighboring pixels included in each of the packets for the neighboring pixels;
   determining for each of the packets for the neighboring pixels whether a predicted bit number sum obtained by summing the predicted number of bits of a pixel difference value of each of the neighboring pixels is less than a current bit number sum obtained by summing a current number of bits of the pixel difference value of each of the neighboring pixels; and
   performing the entropy coding of only packets in which the predicted bit number sum is less than the current bit number sum from among the packets for the neighboring pixels.

5. A method of restoring video, the method comprising:
   receiving a plurality of packets associated with pixels of a video frame;
   classifying the plurality of packets based on whether each of the plurality of packets is a first packet including pixel values of reference pixels, a second packet including pixel difference values which are difference values between pixel values of the pixels, or a third packet in which entropy coding has been performed for pixel difference values, wherein the entropy coding has been selectively applied to only a subset of packets and the subset of packets to which the entropy coding is applied are determined based on positions of pixels in one pixel block, the subset being fewer than all packets including the pixel difference values;
   performing pulse code modulation decoding, without performing entropy decoding, of first packets based on a result of the classifying;
   performing pulse code modulation decoding, without performing entropy decoding, of second packets based on a result of the classifying;
   performing entropy decoding of the third packet based on a result of the classifying; and
   restoring the video frame based on the pixel values of the reference pixels of the first packet, the pixel difference values of the second packet, and the pixel difference values of the decoded third packet.

6. The method of claim 5, wherein the restoring of the video frame comprises:
   restoring pixel values of first neighboring pixels adjacent to the reference pixels by adding first pixel difference values, which are difference values between the pixel values of the reference pixels and the pixel values of the first neighboring pixels, to the pixel values of the reference pixels;
   restoring pixel values of second neighboring pixels adjacent to the first neighboring pixels by adding second pixel difference values, which are difference values between the pixel values of the first neighboring pixels and pixel values of the second neighboring pixels, to the pixel values of the second neighboring pixels; and
   restoring the video frame based on the pixel values of the reference pixels, the pixel values of the first neighboring pixels, and the pixel values of the second neighboring pixels.

7. An apparatus for generating video packets, the apparatus comprising:
   a pixel block generator which generates at least one pixel block consisting of at least one reference pixel and a plurality of neighboring pixels adjacent to the at least one reference pixel from pixels of a video frame;
   a pixel value management unit which replaces pixel values of the neighboring pixels in the at least one pixel block with pixel difference values, which are difference values between a pixel value of one of pixels adjacent to the neighboring pixels and the pixel values of the neighboring pixels;
   a packet generator which generates packets so that a pixel value of the at least one reference pixel and the pixel difference values of the neighboring pixels are allocated to different packets according to positions of the pixels; and
   a coder which determines whether a packet includes the reference pixel, performs pulse code modulation coding, without performing entropy coding, of packets including the reference pixel based on a result of the determination, and selectively performs entropy coding of packets that do not include the reference pixel based on the result of the determination,
   wherein the entropy coding is applied to a first subset of packets including the pixel difference values and the pulse code modulation coding is applied, without performing entropy coding, to a second subset of packets including the pixel difference values, the second subset of packets being different from the first subset of packets, and
   wherein the packets to which the entropy coding is applied are determined based on positions of pixels in the at least one pixel block.

8. The apparatus of claim 7, wherein the pixel block generator determines a size of the at least one pixel block and generates the at least one pixel block based on the determined pixel block size.

9. The apparatus of claim 7, wherein the pixel block generator generates a plurality of slices by dividing the video frame in a slice unit having a predetermined size and generates the at least one pixel block from pixels in the plurality of slices.

10. The apparatus of claim 7, wherein the coder calculates a predicted number of bits of a coding result value to be obtained when the entropy coding is performed for each of the pixel difference values of the neighboring pixels included in each of the packets for the neighboring pixels, determines for each of the packets for the neighboring pixels whether a predicted bit number sum obtained by summing the predicted number of bits of a pixel difference value of each of the neighboring pixels is less than a current bit number sum obtained by summing the current number of bits of the pixel difference value of each of the neighboring pixels, and performs the entropy coding of only packets in which the predicted bit number sum is less than the current bit number sum from among the packets for the neighboring pixels.

11. An apparatus for restoring video, the apparatus comprising:

a receiver which receives a plurality of packets associated with pixels of a video frame;

a packet classifier which classifies the plurality of packets based on whether each of the plurality of packets is a first packet including pixel values of reference pixels, a second packet including pixel difference values which are difference values between pixel values of the pixels, or a third packet in which entropy coding has been performed for pixel difference values, wherein the entropy coding has been selectively applied to only a subset of packets and the subset of packets to which the entropy coding is applied are determined based on positions of pixels in one pixel block, the subset being fewer than all packets including the pixel difference values;

a decoder which performs pulse code modulation decoding, without performing entropy decoding, of first packets based on a result of the classification by the packet classifier, performs pulse code modulation decoding, without performing entropy decoding, of second packets based on a result of the classification by the packet classifier, and performs entropy decoding of the third packet based on a result of the classification by the packet classifier; and a restorer which restores the video frame based on the pixel values of the reference pixels of the first packet, the pixel difference values of the second packet, and the pixel difference values of the decoded third packet.

12. The apparatus of claim 11, wherein the restorer restores pixel values of first neighboring pixels adjacent to the reference pixels by adding first pixel difference values, which are difference values between the pixel values of the reference pixels and the pixel values of the first neighboring pixels, to the pixel values of the reference pixels, restores pixel values of second neighboring pixels adjacent to the first neighboring pixels by adding second pixel difference values, which are difference values between the pixel values of the first neighboring pixels and pixel values of the second neighboring pixels, to the pixel values of the second neighboring pixels, and restores the video frame based on the pixel values of the reference pixels, the pixel values of the first neighboring pixels, and the pixel values of the second neighboring pixels.

13. A non-transitory computer-readable recording medium storing a computer-readable program for executing the method of claim 1.

14. The method of claim 1, wherein the performing entropy coding comprises performing entropy coding based on positions of pixels of each packet in the at least one pixel block.

* * * * *